Patented Jan. 8, 1952

2,582,129

UNITED STATES PATENT OFFICE 2,582,129

PREVENTION OF CORROSION IN AQUEOUS SYSTEMS

Arthur L. Jacoby, Western Springs, Ill., assignor to National Aluminate Corporation, Chicago, Ill., a corporation of Delaware No Drawing. Application September 13, 1948, Serial No. 49,123

9 Claims. (Cl. 252—71)

This invention relates to the prevention of corrosion by aqueous heat transfer media for use in heat exchange devices and the like, such as the cooling systems of internal combustion engines, oil coolers, and other heat exchangers, particularly those devices containing, in addition to ferrous metals, aluminum in contact with copper, brass, or similar alloys.

The corrosive action of aqueous solutions on metals presents an important problem in various industries. One instance in which the problem has become particularly important is the use of natural waters, or softened or "deionized" waters as heat transfer media in cooling systems associated with internal combustion engines, including not only the solutions used in the engine jackets but also those employed in auxiliary heat exchange devices, such as, for example, oil coolers. Corrosion of the metals of such heat exchange systems is, of course, undesirable, not only because it may cause actual failure of cylinder walls, but particularly because the products of corrosion frequently tend to clog the smaller passages of the system, impairing the circulation. At other times the corrosion products may adhere to the walls of the system in such a way that they seriously reduce the rate of heat transfer.

The number of attempted solutions to this problem has been large. Many materials have been suggested and used in an effort to reduce the corrosive tendencies of waters toward the common cooling system metals. Some of these materials have met with moderate success in that they have provided substantial protection for certain metals, but most of them fall short in their capacity to adequately protect all parts of the cooling systems commonly encountered. Especially is this true in the case of systems in which aluminum, in contact with copper, brass, Admiralty metal, or other similar alloy, occurs.

One of the objects of the present invention is to provide an aqueous heat transfer medium which is substantially non-corrosive to ferrous metals and other metals commonly encountered in heat transfer systems, including aluminum in contact with copper, brass, Admiralty metal, and other similar alloys.

Another object of this invention is to provide a composition which, when added to natural, softened, or deionized water, will render it substantially non-corrosive to ferrous and other metals, particularly aluminum, in contact with copper, brass, Admiralty metal, and other similar alloys.

A still further object is to provide a composition, as set forth above, which will also furnish a control of the pH of the system within a desired range. Other objects will appear hereinafter.

In accordance with this invention, it has now been found that the ferrous metals, and also aluminum and aluminum alloys in contact with copper and copper alloys, e. g., brass, Admiralty metal, and similar alloys, are very effectively protected from the corrosion of aqueous solutions in contact therewith when said solutions contain soluble chromate and soluble nitrate at a pH of, preferably, 6.5 to 9.5. Under comparable experimental or operating conditions an aluminum-copper alloy couple is not adequately protected by soluble chromate alone, or by soluble nitrate alone, in spite of the fact that chromate is widely and successfully used for protecting ferrous metals, and soluble nitrates, under certain conditions, are known to protect aluminum.

While the concentrations of the two inhibitors, required to adequately protect the aluminum in an aluminum-alloy couple, will vary somewhat with the corrosiveness of the water and with the hardness and other characteristics thereof, it has been found that a water soluble chromate in the range of 500 to 3000 parts per million (P. P. M.) (0.05% to 0.30% by weight), expressed as $Na_2Cr_2O_7.2H_2O$, and a water soluble nitrate in the range of 250 to 1000 parts per million (0.025% to 0.10% by weight), expressed as $NaNO_3$, is adequate when the pH of the solution is within the approximate range of 6.5 to 9.5. The protection afforded ferrous metals by chromate in this preferred concentration range is well known. However, as stated above, neither the chromate by itself nor the nitrate by itself, in the ranges given here, will render the waters non-corrosive to the aluminum of the aluminum-alloy couple. These facts may be further illustrated by some exemplary test results, tabulated below.

One testing method employed has been rather briefly described by J. T. Nicholson in the periodical, "Corrosion," vol. 4, No. 1, January, 1948. A cylindrical test specimen having overall dimensions of approximately 3 inches in length by 0.225 inch diameter was constructed in the following way: A piece of aluminum of the type commonly employed in heat exchangers (95% Al and 5% Si) was turned on a lathe to give a cylinder approximately 1.125 inches in length and 0.225 inch in diameter. This cylinder was then further machined so that the portion of diameter 0.225 inch was 0.625 inch long and the remaining half-inch was reduced to a diameter of about 0.075 inch. A cylinder of Admiralty metal (70% Cu, 29% Zn, and 1% Sn) of length approximately 2 inches and diameter 0.225 inch was then axially bored to receive, with a snug fit, the smaller end of the aluminum cylinder. The resulting specimen was a smooth cylinder approximately 3 inches in total length, containing the two metals in intimate contact. This specimen was then mounted vertically in the chuck of an electric motor so that the aluminum end was down, and immersed to a depth of 1.25 inches in the solution to be tested. The specimen was rotated during the test at a speed of 1750 revolutions per minute.

The solution employed in these tests was made up of a 1:1 (by volume) mixture of Chicago tap water and distilled water, with sodium chloride added to increase the sodium chloride content by 10 grains per gallon. All tests were run at 150° ± 5° F. in a volume of 550 ± 10 milliliters of solution. The inhibitors indicated in the table were dissolved in the test solution before the start of the test. At the end of the test, the specimen was visually examined and the aluminum in the test solution determined.

experienced due to the corrosion of aluminum in such bi-metallic couples even when 3000 to 4000 parts per million of chromate was present in the aqueous coolant, and such failures eliminated by the use of the combination of chromate and nitrate contemplated by this invention.

The effect of pH on corrosion is well known and it is preferable, in most corrosion control processes, to regulate the pH of the aqueous heat transfer medium. The preferred pH range for the present invention is 6.5 to 9.5 and a preferred embodiment of the invention contemplates the provision of a composition similar to that shown last in the table. The sodium carbonate and borax provide the alkalinity necessary to overcome the acidity of the dichromate and a solution of the composition shown in the table, at a concentration of 3000 parts per million (by weight) in distilled water has a pH of 6.78, while a solution of the same strength in Chicago tap water has a pH of 6.84. Due to the buffering action of the borax, these solutions, upon being heated for 340 hours at 150° F. to 160° F., changed only to pH values of 6.80 and 7.26, respectively.

Obviously, any water soluble chromate or dichromate, including those of the alkali metals, ammonia, etc., and any water soluble nitrate salt,

Table

| Inhibitor | Dose, P. P. M. | | | Hr. | pH Range | Average Penetration, Mils/Yr. | Percent Change in Corrosion over Blank |
| --- | --- | --- | --- | --- | --- | --- | --- |
| | Total | Chromate [1] | NaNO$_3$ | | | | |
| None | 0 | 0 | 0 | 96 | 8.2-9.5 | 18.3 | |
| NaNO$_3$ | 2,000 | 0 | 2,000 | 336 | 9.0-9.5 | 23.1 | +26 |
| | 4,000 | 0 | 4,000 | 336 | 9.0-9.5 | 30.0 | +64 |
| | 7,000 | 0 | 7,000 | 336 | 9.0-9.5 | 26.9 | +47 |
| | 10,000 | 0 | 10,000 | 336 | 9.0-9.5 | 23.7 | +30 |
| Chromate | 920 | 920 | 0 | 194 | 8.3-9.5 | 11.9 | -35 |
| | 4,590 | 4,590 | 0 | 194 | 8.5-9.5 | 12.9 | -30 |
| | 10,000 | 10,000 | 0 | 194 | 8.6-9.5 | 12.9 | -30 |
| 64.7% Chromate<br>35.3% NaNO$_3$ | 1,420 | 920 | 500 | 381 | 8.5-9.5 | 3.6 | -80 |
| 47.8% Chromate<br>52.2% NaNO$_3$ | 1,920 | 920 | 1,000 | 381 | 8.7-9.5 | 3.9 | -79 |
| 60% Chromate<br>20% NaNO$_3$<br>15% Na$_2$CO$_3$<br>5% Borax | 3,000 | 1,800 | 600 | 399 | 9.4-9.5 | 9.8 | -46 |
| | 3,000 | 1,800 | 600 | 399 | 8.1-8.6 | 3.8 | -79 |
| | 6,000 | 3,580 | 1,200 | 399 | 9.4-9.5 | 6.2 | -66 |

[1] Chromate throughout this table is expressed as Na$_2$Cr$_2$O$_7$.2H$_2$O.

From the results shown in the table, it is apparent that the aluminum of the aluminum-alloy couple is severely attacked in the absence of any inhibitor. Although, under some conditions, nitrates are recommended for the protection of aluminum, the results of the tests show that the aluminum of the couple is even more severely corroded when the only treating agent is sodium nitrate, up to concentrations of NaNO$_3$ as high as 10,000 parts per million (1.0% by weight). Additionally, sodium nitrate employed alone would not protect the other metals in the cooling system.

Chromate, under the test conditions, also does not adequately protect the aluminum in the aluminum-alloy couple, although it is true that chromate, in the concentration range tested, will adequately protect the ferrous metals in the system. However, the combination of chromate and nitrate exhibits the remarkable property of very greatly reducing the corrosion of the aluminum in the aluminum-alloy couple. As illustrated, moreover, the result is obtained with a fraction of a per cent of total chromate and nitrate based upon the weight of the solution treated.

The above observations are also borne out in field practice where serious failures have been are equally suitable for the practice of this invention. The term "water soluble" refers to water solubility at least sufficient to cause solution of the chromates and nitrates in the proportions of 500 parts per million and 250 parts per million, respectively.

The invention is hereby claimed as follows:

1. A noncorrosive aqueous solution consisting essentially of water and approximately 1800 parts per million, by weight, of chromate, as $$Na_2Cr_2O_7.2H_2O$$

and 600 parts per million, by weight, of nitrate, as NaNO$_3$, and having a pH in the range 6.5 to 9.5.

2. A corrosion inhibiting composition adapted to be added to an aqueous fluid which contacts metallic surfaces, said composition consisting essentially of a water soluble chromate and a water soluble nitrate in relative weight proportions of 500 to 3000 parts of the water soluble chromate, expressed as Na$_2$Cr$_2$O$_7$.2H$_2$O, and 250 to 1000 parts of the water soluble nitrate, expressed as NaNO$_3$, said composition being effective to inhibit corrosion in aqueous solutions in contact with aluminum and copper when present in said solutions in proportions corresponding to 0.05 to 0.3% by weight of water soluble chromate, expressed as $Na_2Cr_2O_7.2H_2O$, and 0.025 to 0.1% by weight of water soluble nitrate, experssed as $NaNO_3$.

3. A corrosion inhibiting composition for addition to an aqueous heat transfer medium which contacts metallic surfaces, said composition consisting essentially of sodium dichromate and sodium nitrate in relative weight proportions of 500 to 3000 parts of sodium dichromate to 250 to 1000 parts of sodium nitrate, said composition being effective to inhibit corrosion in aqueous solutions in contact with aluminum and copper when present in said solutions in proportions corresponding to 0.05 to 0.3% by weight of sodium dichromate and 0.025 to 0.1% by weight of sodium nitrate.

4. An aqueous solution having a pH within the range of 6.5 to 9.5, inhibited against corrosion by 500 to 3000 parts per million of a water soluble chromate, expressed as $Na_2Cr_2O_7.2H_2O$, and 250 to 1000 parts per million of a water soluble nitrate.

5. A corrosion inhibiting composition comprising essentially 64.7% by weight water soluble chromate, expressed as $Na_2Cr_2O_7.2H_2O$, and 35.3% by weight sodium nitrate, said composition being effective to inhibit corrosion in aqueous solutions in contact with aluminum and copper when present in said solutions in proportions corresponding to 0.05 to 0.3% by weight of water soluble chromate, expressed as $Na_2Cr_2O_7.2H_2O$, and 0.025 to 0.1% by weight of water soluble nitrate, expressed as $NaNO_3$.

6. A corrosion inhibiting composition comprising essentially 47.8% by weight water soluble chromate, expressed as $Na_2Cr_2O_7.2H_2O$, and 52.2% by weight sodium nitrate, said composition being effective to inhibit corrosion in aqueous solutions in contact with aluminum and copper when present in said solutions in proportions corresponding to 0.05 to 0.3% by weight of water soluble chromate, expressed as $Na_2Cr_2O_7.2H_2O$, and 0.025 to 0.1% by weight of water soluble nitrate, expressed as $NaNO_3$.

7. A corrosion inhibiting composition comprising essentially 60% by weight water soluble chromate, expressed as $Na_2Cr_2O_7.2H_2O$, 20% by weight sodium nitrate, 15% by weight sodium carbonate and 5% by weight borax, said composition being effective to inhibit corrosion in aqueous solutions in contact with aluminum and copper when persent in said solutions in proportions corresponding to 0.05 to 0.3% by weight of water soluble chromate, expressed as $$Na_2Cr_2O_7.2H_2O$$

and 0.025 to 0.1% by weight of water soluble nitrate, expressed as $NaNO_3$.

8. A method of inhibiting corrosion in aqueous solutions in contact with both aluminum and copper which comprises incorporating with said solutions 500 to 3000 parts per million of a water soluble chromate, expressed as $$Na_2Cr_2O_7.2H_2O$$

and 250 to 1000 parts per million of a water soluble nitrate.

9. A method of inhibiting corrosion in aqueous solutions in contact with metallic couples in which aluminum acts as one element of the couple and copper as another which comprises incorporating with said solutions 500 to 3000 parts per million of a water soluble chromate, expressed as $Na_2Cr_2O_7.2H_2O$, and 250 to 1000 parts per million of a water soluble nitrate while maintaining a pH within the range of 6.5 to 9.5.

ARTHUR L. JACOBY.

REFERENCES CITED

The following references are of record in the file of this patent:

UNITED STATES PATENTS

| Number | Name | Date |
|---|---|---|
| 1,804,463 | Erickson | May 12, 1931 |
| 1,827,223 | Dennis | Oct. 13, 1931 |
| 1,927,842 | McDermott | Sept. 26, 1933 |
| 1,953,003 | Michel | Mar. 27, 1934 |
| 2,141,049 | Skeen | Dec. 20, 1938 |
| 2,153,952 | Bayes | Apr. 11, 1939 |
| 2,411,676 | Burghart | Nov. 26, 1946 |